United States Patent
Akutsu (10) Patent No.: US 9,156,374 B2
(45) Date of Patent: Oct. 13, 2015

(54) VEHICLE SEAT

(71) Applicant: TS TECH CO., LTD., Asaka-shi, Saitama (JP)

(72) Inventor: Takeshi Akutsu, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 216 days.

(21) Appl. No.: 13/955,754

(22) Filed: Jul. 31, 2013

(65) Prior Publication Data

US 2014/0035335 A1 Feb. 6, 2014

(30) Foreign Application Priority Data

Jul. 31, 2012 (JP) ................................. 2012-170173

(51) Int. Cl.
*B60N 2/00* (2006.01)
*B60N 2/07* (2006.01)

(52) U.S. Cl.
CPC .............. *B60N 2/002* (2013.01); *B60N 2/0732* (2013.01)

(58) Field of Classification Search
CPC .............................. B60N 2/002; B60N 2/7032
USPC ........................................... 297/217.3, 344.1
See application file for complete search history.

(56) References Cited

U.S. PATENT DOCUMENTS 7,137,665 B2 * 11/2006 Osawa et al. ............... 297/217.3
7,455,343 B2 * 11/2008 Endo et al. .................... 296/68.1

FOREIGN PATENT DOCUMENTS

EP          1930209 A1 *  6/2008
JP       2010-269794      12/2010
WO   WO 2006011597 A1 *  2/2006

* cited by examiner

*Primary Examiner* — Anthony D Barfield
(74) *Attorney, Agent, or Firm* — Hamre, Schumann, Mueller & Larson, P.C.

(57) ABSTRACT

In a vehicle seat, left and right first frames extending in a front-rear direction are disposed apart from each other in a lateral direction. Each first frame includes a bottom wall to which a load sensor for measuring a weight of an occupant is attached, and sidewalls extending upward from left and right sides of the bottom wall. One or each of front and rear end portions of the left first frame is connected to a corresponding end portion of the right first frame by a connecting member. The bottom wall of at least one of the left and right first frames includes a connecting portion that is an end portion of the bottom wall to which the connecting member is connected and which extends outward in the front-rear direction farther beyond outer edges of the sidewalls, bending around the connecting member to its outer side in the front-rear direction.

9 Claims, 5 Drawing Sheets

VEHICLE SEAT

CROSS-REFERENCE TO RELATED APPLICATION(S)

This application claims priority from Japanese Patent Application No. 2012-170173 filed on Jul. 31, 2012, the disclosure of which is incorporated herein by reference in its entirety.

BACKGROUND

The present invention relates to a vehicle seat with a load sensor for measuring a weight of an occupant.

Applicant has previously proposed a vehicle seat comprising a frame-like seat cushion frame configured to receive a load from the occupant and load sensors configured to receive the load from the occupant through the seat cushion frame (see JP 2010-269794 A, disclosure of which is incorporated by reference in its entirety). To be more specific, the seat cushion frame in this vehicle seat comprises a pair of side frames extending in a front-rear direction, a pair of patch members each disposed at a laterally inner side of a corresponding side frame, a connecting pipe connecting rear end portions of the side frames and the patch members, and a connecting member having a substantially U-shaped cross section and connecting front end portions of the side frames and the patch members.

Each of the aforementioned patch members is formed to have a substantially U-shaped cross section which opens upward. The load sensors are provided at both end portions of the two patch members. Each load sensor includes a rod for receiving a load, and the rod of each load sensor is attached to an end portion of a bottom wall of each patch member. The connecting pipe is provided to pierce through rear end portions of sidewalls of each patch member. In a front end portion of each patch member, the bottom wall extends frontward farther than the sidewalls and is connected to an undersurface of the connecting member.

However, with this configuration which is required to have the sidewalls elongated to the position of the connecting pipe so that the connecting pipe is pierced through the sidewalls of the patch member. This would result in undesirable upsizing of the patch member (by the elongated lengths of the sidewalls). Moreover, the above-described configuration provides a frontwardly (and horizontally) elongated portion in the bottom wall, and only that frontwardly elongated portion of the bottom wall is connected to the underside of the connecting member; thus, it would be considered desirable to provide an improved configuration which can more stably support the connecting member by the patch member.

With this in view, there is a need for improvement in the configuration of a frame to which a load sensor is attached such that a vehicle seat can be downsized and the connecting member can be supported with increased stability.

SUMMARY

In one aspect, a vehicle seat with a load sensor for measuring a weight of an occupant is provided. This vehicle seat comprises left and right first frames extending in a front-rear direction and disposed apart from each other in a lateral direction, and at least one connecting member extending between the left and right first frames, such that one or each of front and rear end portions of the left first frame is connected to a corresponding end portion of the right first frame by the connecting member. Each first frame includes a bottom wall to which the load sensor is attached, and sidewalls extending upward from left and right sides of the bottom wall. The bottom wall of at least one of the left and right first frames includes a connecting portion that is an end portion of the bottom wall to which the connecting member is connected and which extends outward in the front-rear direction farther beyond outer edges of the sidewalls in the front-rear direction and bends around the connecting member to an outer side of the connecting member in the front-rear direction.

With this configuration, the sidewalls having a shorter length in the front-rear direction can be implemented in comparison with an alternative configuration in which the sidewalls of the first frame are connected to the connecting member. As a result, the vehicle seat can be downsized. Furthermore, this configuration can enhance the stability in the support of the connecting member by the connecting portion because the connecting portion is configured to bend around the connecting member to its outer side in the front-rear direction.

In the vehicle seat described above, the bottom wall in which the connecting portion is provided may, preferably but not necessarily, include a sensor mount portion to which the load sensor is attached and a bent portion disposed between the sensor mount portion and the connecting portion.

The connecting portion configured to have no direct connection to the sidewalls as described above, unless no bent portion is provided, would possibly be low in rigidity. Provision of the bent portion between the sensor mount portion and the connecting portion makes it possible to provide the connecting portion with rigidity increased by the bent portion.

The vehicle seat as described above may further comprise a fastening member by which the load sensor is fastened to a member disposed under the load sensor, and the bent portion may include a first bent portion that extends from the sensor mount portion and bends upward, and a second bent portion that extends from an upper end of the first bent portion, bends outward in the front-rear direction and connects to the connecting portion. In this configuration, the fastening member may, preferably but not necessarily, be disposed adjacent to and at an outer side of the first bent portion in the front-rear direction.

With this configuration in which the bent portion is provided between the sensor mount portion and the connecting portion, some possibly feel apprehension that the bent portion would produce useless and thus unwanted space in the vehicle seat. By arranging the fastening member for the load sensor in the space formed by the bent portion, this space can be utilized effectively.

In the vehicle seat with the bent portion disposed between the sensor mount portion and the connecting portion as described above, the bottom wall in which the connecting portion is provided may include a first protrusion that includes a portion, formed in the connecting portion, which extends from a bending outer portion of the connecting portion disposed at an outer side of the connecting member in the front-rear direction toward the bent portion of the bottom wall at which the sidewalls are provided.

Some possibly feel apprehension that the connecting portion would be low in rigidity for the reasons as described above. By forming in the connecting portion the first protrusion which extends from a bending outer portion of the connecting portion disposed at an outer side of the connecting member in the front-rear direction toward the bent portion of the bottom wall at which the sidewalls are provided, the connecting portion can be reinforced by the first protrusion so that the rigidity of the connecting portion can be increased.

In the vehicle seat with the first protrusion as described above, the first protrusion may further include an inwardly extended portion which is formed in a portion of the bottom wall at which the sidewalls are provided, whereby the first protrusion extends from the bending outer portion of the connecting portion disposed at the outer side of the connecting member, inward in the front-rear direction across an outer edge of the portion of the bottom wall at which the sidewalls are provided.

If the first protrusion only includes a portion formed in the connecting portion, that is, extends to a position short of a portion of the bottom wall at which the sidewalls are provided, then a basal portion of the connecting portion would not be enhanced. By providing the first protrusion extending across the outer edge of the portion of the bottom wall at which the sidewalls are provided from outside to inside (i.e., providing the inwardly extended portion which continuously extends from the portion of the first protrusion formed in the connecting portion to the inside of the outer edge of the portion of the bottom wall at which the sidewalls are provided), the rigidity of the basal portion of the connecting portion can be increased.

In the vehicle seat described above, with or without one or more of the aforementioned additional features, the outer edges of the sidewalls in the front-rear direction may be adjacent to the connecting member.

Some would still feel apprehension that the connecting portion would be low in rigidity for the reasons as described above. By arranging the outer edges of the sidewalls in positions adjacent to the connecting member, the connecting portion can be shortened in its length in the front-rear direction, and thus the rigidity of the connecting portion can be increased.

In the vehicle seat described above, with or without one or more of the aforementioned additional features, the load sensor may be attached to each of two end portions of the bottom wall in the front-rear direction, and the bottom wall may have a recessed portion provided in a midsection between the two end portions of the bottom wall.

It is understood that a midsection of the first frame which is supported at two end portions by two load sensors may be configured to have an increased rigidity so that transmission of the load from the first frame to each of the load sensors can be improved. In this respect, provision of the recessed portion in a midsection of the bottom wall between the two end portions of the bottom wall may be advantageous in that the rigidity of the midsection of the first frame between the load sensors can be enhanced and thus the transmission of the load from the first frame to the load sensors can be improved.

The vehicle seat described above, with or without one or more of the aforementioned additional features, may further comprise a second frame which includes left and right outer walls disposed at laterally outer sides of the left and right first frame. In this configuration, the bottom wall of the first frame may include a narrower portion disposed at a laterally inner side of a corresponding outer wall of the second frame and a wider portion being wider than the narrower portion and configured to protrude toward a laterally outer side farther beyond the outer wall of the second frame. The wider portion may have a hole provided in such a position that a fastening member by which the load sensor is fastened to a member disposed under the load sensor is disposed inside the hole.

If the bottom wall fails to include the wider portion and only includes the narrower portion, a clearance for disposing the fastening member would be in the form of a cutaway which opens to one of the left and right sides with the result that the bottom wall extends only at one side of the fastening member in the lateral direction, and thus the rigidity of the first frame would be low around the fastening member. Provision of the wider portion makes it possible to provide a hole for the fastening member so that the presence of the bottom wall at both sides of the fastening member in the lateral direction ensures that the rigidity of the first frame around the fastening member (i.e., in the vicinity of the load sensor) is made high enough.

In the vehicle seat with the wider and narrower portions provided in the bottom wall of the first frame as described above, the sidewalls may include a first outer sidewall extending upward from a laterally outer side of the narrower portion of the bottom wall and a second outer sidewall extending upward from a laterally outer side of the wider portion of the bottom wall. In this configuration, the second outer sidewall may have an end portion adjoining to the first outer sidewall, and the end portion of the second outer sidewall may be lower than the first outer sidewall. Further, the bottom wall in which the connecting portion is provided may, preferably but not necessarily, include a second protrusion which extends from the narrower portion to the wider portion across a border between the narrower and wider portions.

With the aforementioned configuration in which the end portion (portion adjoining to the first outer sidewall) of the second outer sidewall is lower (smaller in its height-direction dimension) than the first outer sidewall, an end portion of the first frame having the lower end portion of the second outer sidewall (extending upward from the laterally outer side of the wider portion of the bottom wall) would be low in rigidity. Provision of the second protrusion extending in the bottom wall from the narrower portion to the wider portion across the border between the narrower and wider portions makes it possible to reinforce the end portion of the first frame corresponding to the lower end portion of the second outer sidewall extending upward from the laterally outer side of the wider portion of the bottom wall by the second protrusion, so that the rigidity of that portion of the first frame can be increased.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which:

FIGS. 5A-5C show a structure of a front-side portion of the patch member, in which

DETAILED DESCRIPTION OF THE EMBODIMENTS

A detailed description will be given of an illustrative embodiment of the present invention with reference to the drawings. In the following description, a general configuration of a car seat as an example of a vehicle seat will be briefly described at the outset, and features relating to the present invention will be described in detail.

Figure 1:
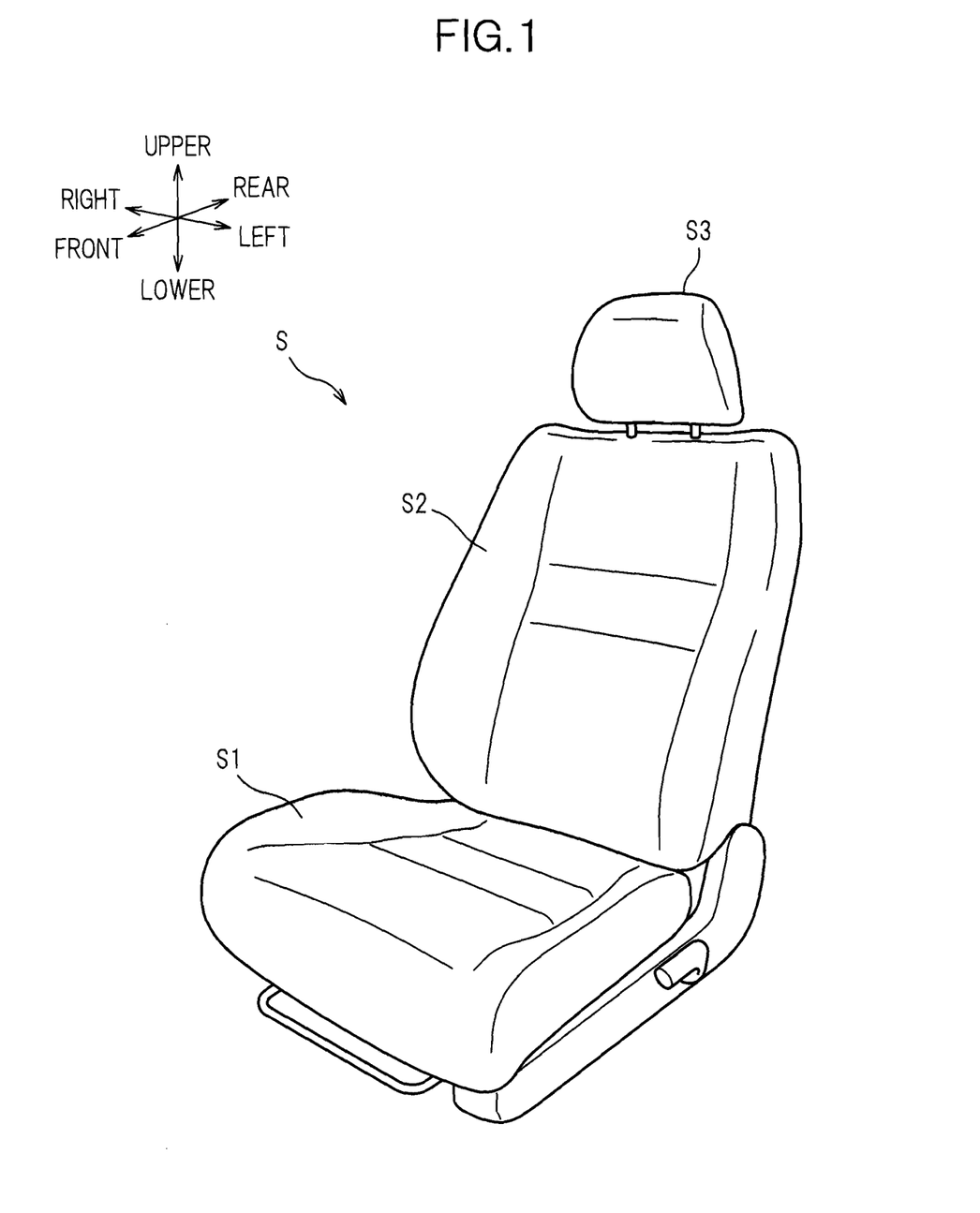
FIG. 1 is a perspective view of a car seat as an example of a vehicle seat according to one illustrative embodiment.

As shown in FIG. 1, a car seat S is a seat for use as a driver's seat in an automobile, and principally includes a seat cushion S1, a seat back S2 and a head rest S3.

Figure 2:
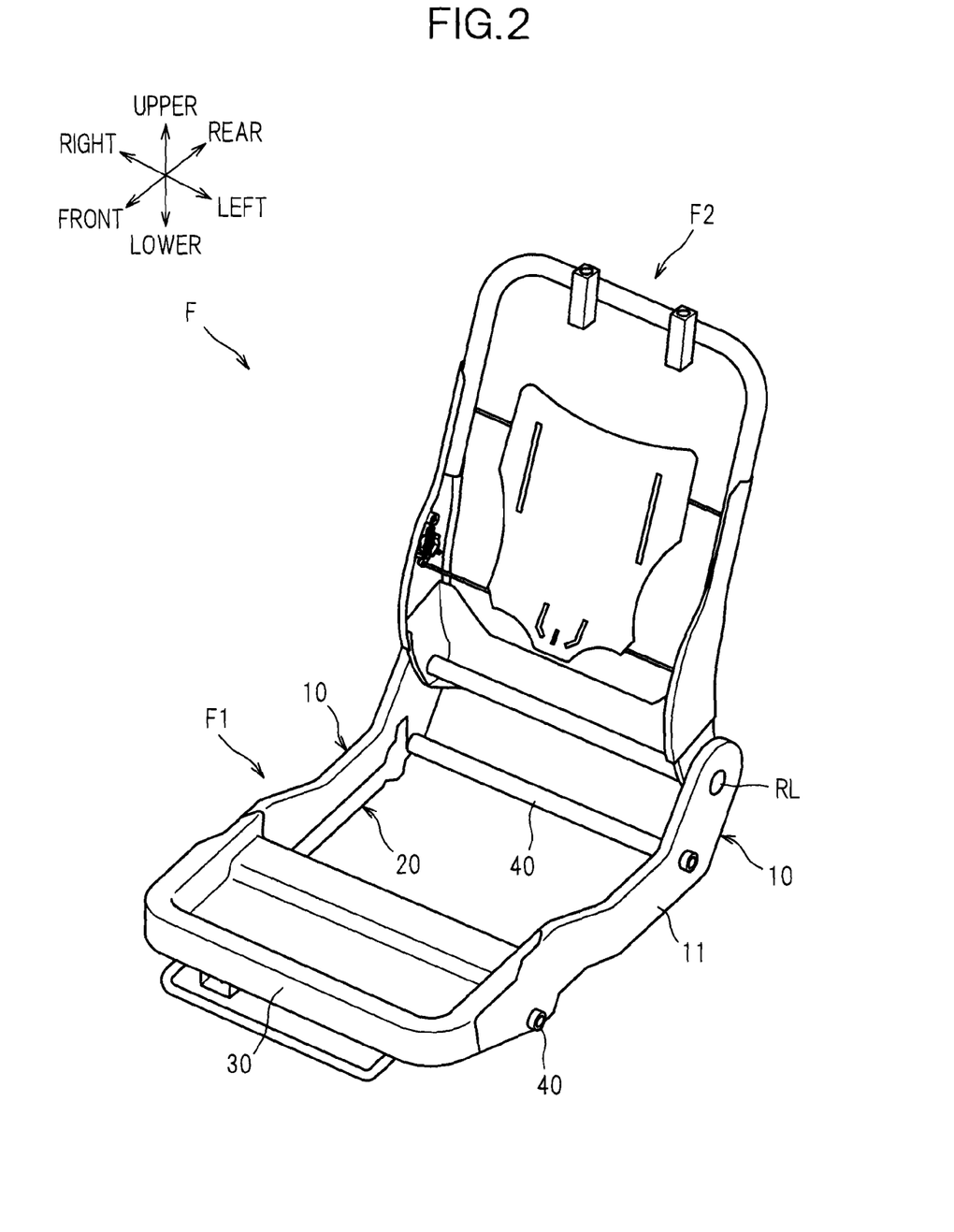
FIG. 2 is a perspective view of a seat frame incorporated in the car seat.

The seat cushion S1 and the seat back S2 incorporate a seat frame F as shown in FIG. 2. The seat frame F is mainly composed of a seat cushion frame F1 which constitutes a frame of the seat cushion S1 and a seat back frame F2 which constitutes a frame of the seat back S2. The seat cushion S1 is formed by covering the seat cushion frame F1 with a seat cushion pad made of cushion material such as urethane foam and a skin material made of synthetic leather or fabric, etc. The seat back S2 is formed by covering the seat back frame F2 with a seat back pad made of cushion material and a skin material made of synthetic leather or fabric, etc.

Figure 3:
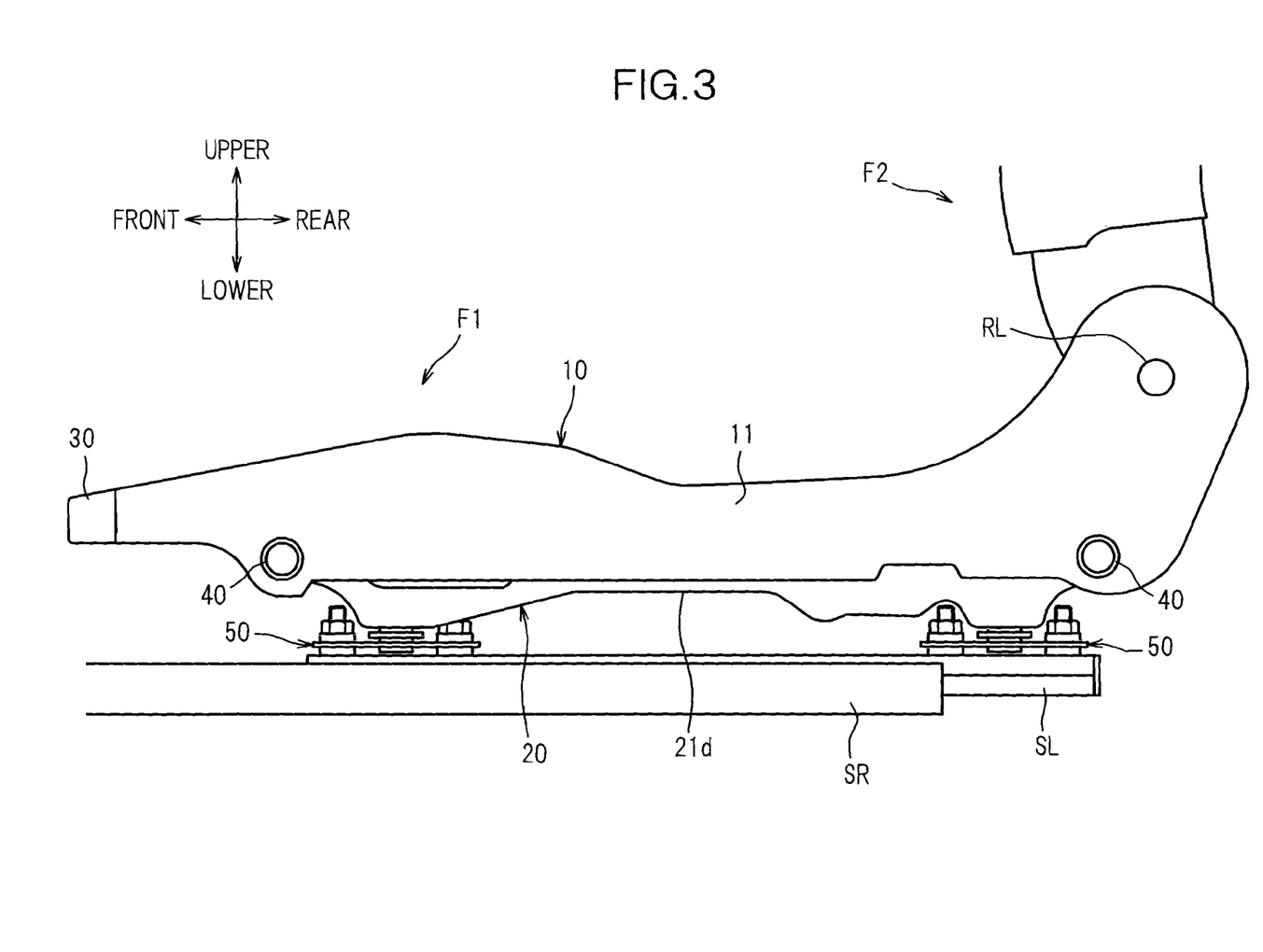
FIG. 3 is a left side elevation of a lower portion of the seat frame.

The seat cushion frame F1 is a frame shaped substantially like a rectangle, and is mounted on sliders SL which are supported, slidably frontward and rearward, on a pair of slide rails SR provided on the floor of the automobile (see FIG. 3). This makes it possible to adjust the position of the car seat S in a front-rear direction.

The seat cushion frame F1 is supported via load sensors 50 (the total number of which is four) provided on upper surfaces of front and rear end portions of the left and right sliders SL extending in the front-rear direction. This makes in possible to measure the weight of an occupant using the load sensors 50.

A lower portion of the seat back frame F2 is pivotally connected via a reclining mechanism RL to a rear portion of the seat cushion frame F1. This makes it possible to tilt the seat the seat back S2 relative to the seat cushion S1 in the front-rear direction.

In describing the embodiment, the front/rear, left/right (lateral), and upper/lower (upward/downward) directions are designated as from the view point of an occupant who is sitting on the car seat S of which the seat back S2 is not in a tilt-back (reclining) position.

The next discussion details the seat cushion frame F1.

As shown in FIGS. 2 and 3, the seat cushion frame F1 mainly includes a pair of side frames 10 as an example of a second frame, a pair of left and right patch members 20 as an example of left and right first frames, a pan frame 30, and a pair of front and rear connecting pipes 40 as an example of at least one connecting member.

The side frames 10 are metal frames extending in the front-rear direction and disposed apart from each other in a lateral direction. The side frames 10 mainly include outer walls 11 disposed at laterally outer sides of the left and right patch members 20, respectively. Front portions of the outer walls 11 of the side frames 10 are connected by the pan frame 30 made of metal and the front connecting pipe 40 made of metal. Rear portions of the outer walls 11 of the side frames 10 are connected by the rear connecting pipe 40 made of metal.

Figure 4:
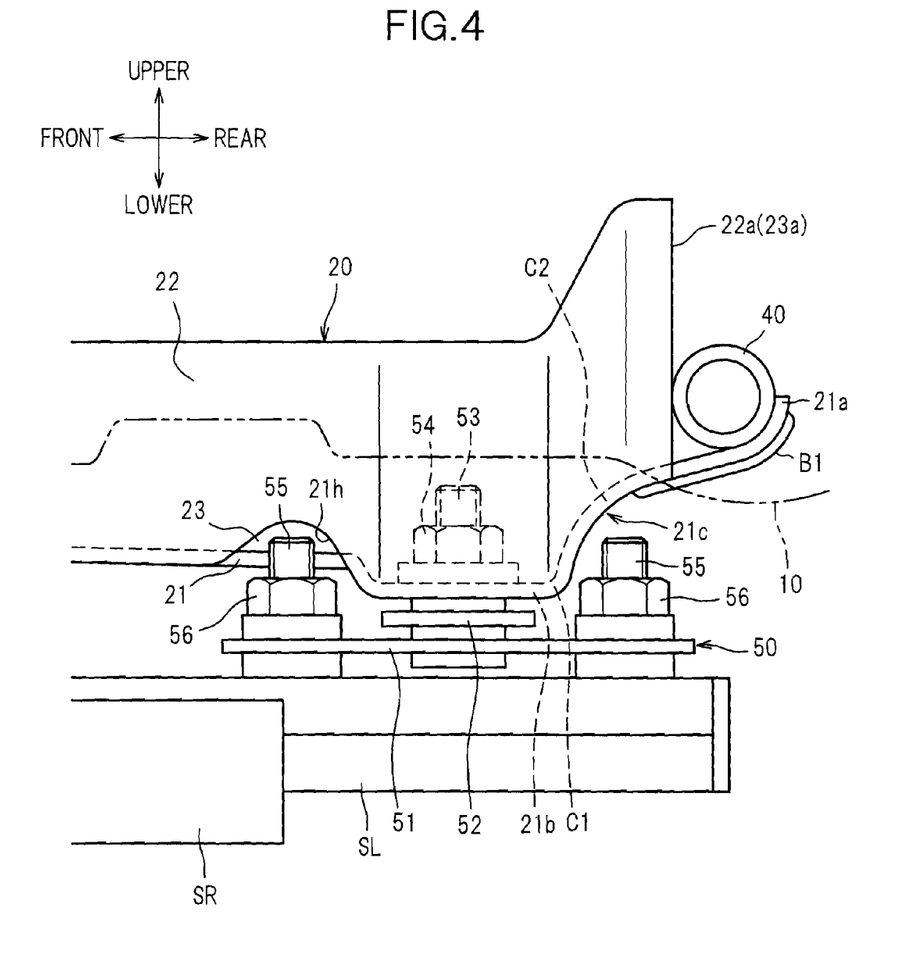
FIG. 4 is an enlarged illustration showing a structure of a rear-side portion of a patch member.
Figure 5A:
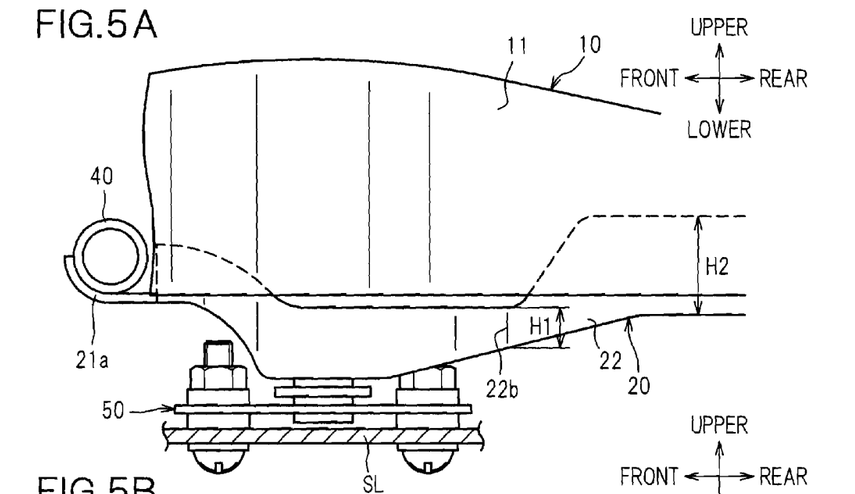
FIG. 5A is a side view.
Figure 5B:
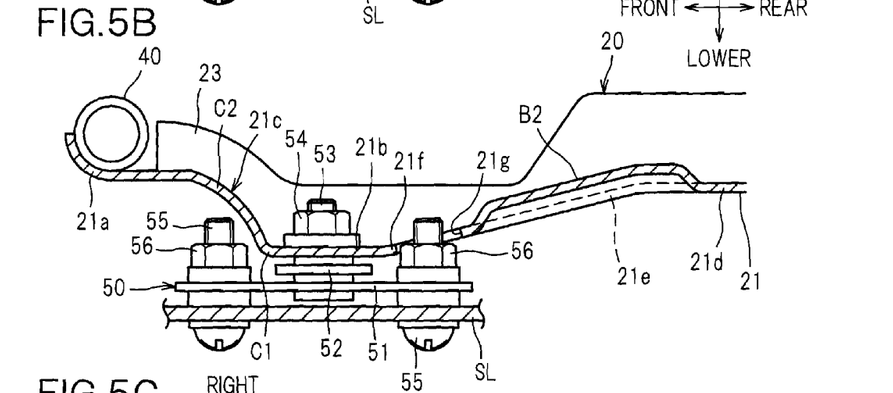
FIG. 5B is a sectional view and FIG. 5C is a top view.
Figure 5C:
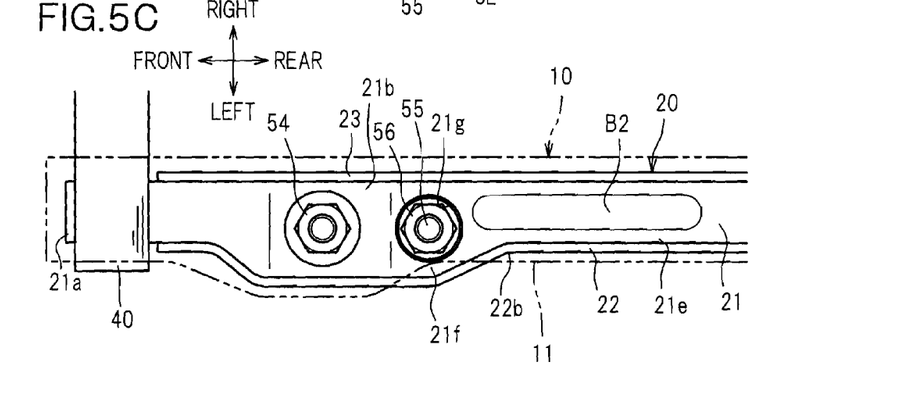

The patch members 20 are metal frames extending in the front-rear direction and disposed apart from each other in the lateral direction. To be more specific, the patch members 20 are disposed adjacent to laterally inner sides of the side frames 10, respectively. As shown in FIGS. 4 and 5, each patch member 20 is configured to have a substantially U-shaped cross section which opens upward.

To be more specific, each patch member 20 includes a bottom wall 21 to which the load sensors 50 are attached, an outer side wall 22 extending upward from a laterally outer side of the bottom wall 21, and an inner side wall 23 extending upward from a laterally inner side of the bottom wall 21. The bottom wall 21 includes connecting portions 21a that are front and rear end portions of the bottom wall 21 to which the front and rear connecting pipes 40 are connected respectively and which extend outward in the front-rear direction (frontward and rearward) farther beyond outer edges (front and rear edges) of the outer sidewall 22 and the inner side wall 23.

In this embodiment, the length of the sidewalls 22, 23 of the patch member 20 in the front-rear direction can be made shorter than an alternative configuration in which the sidewalls of the patch member are connected to the connecting pipes. Therefore, the car seat S can be designed to be compact and lightweight.

To be more specific, each connecting portion 21a extends outward in the front-rear direction and bends around the cylindrical connecting pipe 40 from its lower side along its cylindrical surface to its outer side in the front-rear direction. The connecting portion 21a is joined to the connecting pipe 40 by welding. Since the connecting portion 21a is configured to bend around the connecting pipe 40 to the outer side of the connecting pipe 40 in the front-rear direction (to the front side of the front connecting pipe 40; to the rear side of the rear connecting pipe 40) as described above, the connecting pipes 40 can be supported by the connecting portions 21a with increased stability.

In this embodiment, as shown in FIG. 4, the bottom wall 21 of the patch member 20 includes a first bead B1, as an example of a first protrusion, which extends in a rear connecting portion 21a of the bottom wall 21. The first bead B1 formed in the rear connecting portion 21a extends from a bending outer portion of the connecting portion 21a disposed at the rear (an outer side in the front-rear direction) of the connecting pipe 40 frontward, toward a portion of the bottom wall 21 at which the sidewalls 22, 23 are provided. The first bead B1 is formed by presswork through which a laterally middle portion of the connecting portion 21a is depressed from its inside to its outside so that the first bead B1 protrudes outward from an outer surface of the connecting portion 21a.

With this configuration, the connecting portion 21a can be reinforced by the first bead B1 so that the rigidity of the connecting portion 21a can be increased.

Particular, in the present embodiment, the first bead B1 further extends inward in the front-rear direction across an outer edge of the portion of the bottom wall 21 at which the sidewalls 22, 23 are provided (i.e., the first bead B1 extends inward in the front-rear direction beyond the rear edges 22a, 23a of the sidewalls 22, 23 as shown in FIG. 4). With this configuration, the rigidity of the connecting portion 21a, particularly a basal portion thereof, can be enhanced in comparison with an alternative embodiment in which the first bead only includes a portion extending within the connecting portion 21a, that is, extends to a position short of a portion of the bottom wall at which the sidewalls are provided (extends only outside the rear edges of the sidewalls of the first bead in the front-rear direction).

The sidewalls 22, 23 have their outer edges located adjacent to the connecting pipe 40. With this configuration, the connecting portion 21a can be configured to be shorter in length than an alternative configuration in which the outer edges of the sidewalls 22, 23 are located far away from the connecting pipe, and thus the rigidity of the connecting portion 21a can be further increased.

The sidewalls 22, 23 may be in contact, or not in contact, with the connecting pipe 40. The sidewalls 22, 23 may be configured to overlap the connecting pipe 40 as viewed from above.

The bottom wall 21 includes a sensor mount portion 21b to which the load sensor 50 is attached and a bent portion 21c disposed between the connecting portion 21a and the sensor mount portion 21b. The bent portion 21c is shaped like a letter S in cross section. To be more specific, the bent portion 21c includes a first bent portion C1 that extends from the sensor mount portion 21b and bends upward, and a second bent portion C2 that extends from an upper end of the first bent portion C1, bends outward in the front-rear direction and connects to the connecting portion 21a.

The rigidity of the connecting portion 21a can be enhanced by providing the bent portion 21c.

The load sensor 50 mainly includes a base member 51 shaped like a plate elongated in the front-rear direction, a sensing part 52 provided substantially at the center of the base member 51 in the front-rear direction, and a load receiving rod 53 provided to protrude upward from an upper side of the sensing part 52 with an external thread formed on an outer peripheral surface thereof. The load receiving rod 53 is fastened to the sensor mount portion 21b of the patch member 20 with a nut 54. Thus, the load received from the patch member 20 by the load receiving rod 53 is detected by the sensing part 52.

Front and rear end portions of the base member 51 are fastened to the slider SL with bolts 55 and nuts 56 as an example of a fastening member. The bolt 55 and the nut 56 arranged at the outer end portion of the base member 51 in the front-rear direction are disposed adjacent to and at an outer side of the aforementioned first bent portion C1 in the front-rear direction.

To be more specific, the bolt 55 and the nut 56 are disposed at an outer side of the first bent portion C1 in the front-rear direction C1 and under the second bent portion C2, that is, in the space of which an inner boundary in the front-rear direction is defined by the first bent portion C1 and an upper boundary is defined by the second bent portion C2. By arranging the bolt 55 and the nut 56 in the space formed by the bent portion 21c, the space which would otherwise remain useless can be utilized effectively.

The bottom wall 21 in this embodiment is upwardly recessed in a midsection 21d in the front-rear direction (see FIG. 3). This configuration imparts an arcuate shape to the patch member 20 as a whole, and thus increases the rigidity thereof.

This midsection 21d is provided between the load sensors 50 attached to two end portions of the bottom wall 21 in the front-rear direction. Provision of the recessed midsection 21d of the bottom wall 21 between the load sensors 50 as described above is advantageous in that the rigidity of the midsection 21d of the patch member 20 between the load sensors 50 can be enhanced and thus the transmission of the load from the patch member 20 to the load sensors 50 can be improved.

As shown in FIGS. 5B and 5C, the bottom wall 21 includes a narrower portion 21e which is disposed at a laterally inner side of the outer wall 11 of the corresponding side frame 10, and a wider portion 21f which is wider than the narrower portion 21e and which is configured to protrude toward a laterally outer side farther beyond the outer wall 11 of the side frame 10 (farther outward than the outer wall 11 facing the narrower portion 21e in the lateral direction). The narrower portion 21e is formed to have a constant width, extending substantially in the range from the rear end portion to the central portion of the bottom wall 21.

The wider portion 21f is formed to have a width gradually increasing in the laterally outward direction starting from the front end of the narrower portion 21e toward the front sensor mount portion 21b. The wider portion 21f has a hole 21g for disposing the bolt 55 and the nut 56 for use in fastening the load sensor 50 described above.

In this embodiment, no wider portion 21f is formed in a rear portion of the bottom wall 21. As shown in FIG. 4, in this rear portion of the bottom wall 21, a clearance 21h for disposing the bolt 55 and the nut 56 is in the form of a cutaway or a notch which opens to one of the left and right sides. In contrast, in the front portion of the bottom wall 21 in which the wider portion 21f is provided as described above and thus the hole 21g can be provided instead of a cutaway, the bottom wall 21 is configured to extend at both sides of the bolt 55 and the nut 56 so that the rigidity of the patch member 20 around the bolt 55 and the nut 56 can be enhanced.

The outer sidewall 22 (second outer sidewall) extending upward from the laterally outer side of the wider portion 21f has an end portion adjoining to the outer sidewall 22 (first outer sidewall) extending upward from the laterally outer side of the narrower portion 21e, and this end portion (designated by reference character 22b in FIGS. 5A and 5C) of the outer sidewall 22 (second outer sidewall) formed on the wider portion 21f is lower than the outer sidewall 22 (first outer sidewall) formed on the narrower portion 21e. In other words, the height H1 of a portion of the outer sidewall 22 formed on the bottom wall 21 in the vicinity of the border between the wider portions 21f and the narrower portion 21e is smaller than the height H2 of a portion of the outer sidewall 22 formed on the narrower portion 21e which overlaps the outer wall 11 of the side frame 10 as viewed from the lateral direction.

The outer sidewall 22 (first outer sidewall) formed on the narrower portion 21e is configured to have a greater height to some extent such that this portion of the outer sidewall 22 largely overlaps the outer wall 11 of the side frame 10. Furthermore, the outer sidewall 22 (first outer sidewall) formed on the narrower portion 21e is configured to have a varying height which, from a position near the outer sidewall 22 (second outer sidewall) formed on the wider portion 21f, gradually decreases toward the outer sidewall 22 (second outer sidewall) formed on the wider portion 21f so that the wider portion 21f can be configured to protrude laterally outward beyond the outer wall 11 of the side frame 10.

The wider portion 21f of the bottom wall 21 is configured to protrude together with the outer sidewall 22 in a laterally outward direction, from a position in which an upper end of the outer sidewall 22 formed on the narrower portion 21e comes to a position below a lower end of the outer wall 11 of the side frame 10.

On the other hand, since the midsection 21d of the bottom wall 21 is recessed upward and thus a portion of the bottom wall 21 from a rear end portion of the wider portion 21f to a front end portion of the narrower portion 21e is inclined in an obliquely frontward and downward direction, the height of the outer sidewall 22 formed on the wider portion 21f gradually increases from the front end portion of the narrower portion 21e toward frontward. Therefore, the height of a portion of the outer sidewall 22 formed near the border between the wider portion 21f and the narrower portion 21e is the smallest and thus lowest in rigidity relative to that of the other portion of the outer sidewall 22.

With this in view, as shown in FIGS. 5B and 5C, the bottom wall 21 is configured to include a second bead B2 as an example of a second protrusion which extends from the narrower portion 21e to the wider portion 21f across the border between the narrower and wider portions 21e, 21f. With this configuration, the end portion of the wider portion 21f of which the rigidity would be low because the outer sidewall 22 formed thereon is reinforced by the second bead B2, and thus the rigidity of that portion of the patch member 20 is increased.

Although the illustrative embodiment has been described above, the present invention is not limited to the illustrated embodiment, and those skilled in the art would appreciate that any modifications or changes may be made to any of their specific configurations appropriately without departing from the scope of the present invention, as will be described below.

In the above-described embodiment, two (front and rear) connecting pipes 40 are provided to connect the front end portions of the left and right patch members 20 and to connect the rear end portions of the left and right patch members 20, respectively, but the present invention is not limited to this specific configuration; for example, an alternative configuration may be feasible and possibly advantageous such that the patch members are connected only at one of the front and rear end portions thereof by one connecting member in a manner consistent with the present invention.

In the above-described embodiment, the total four connecting members 21a are provided at the front and rear end portions of the bottom walls 21 of the left and right patch members 20, respectively, but the present invention is not limited to this specific configuration; for example, as long as the bottom wall of at least one of the left and right patch members may be configured to include a connecting portion that is an end portion of the bottom wall to which the connecting pipe is connected, in a manner consistent with the present invention.

In the above-described embodiment, the patch members 20 are illustrated as first frames by way of example, but the present invention is not limited to this example; the first frames consistent with the present invention may be side frames, as an alternative. In other words, a tongue-like connecting portion 21a as described in the present embodiment may be provided in at least one of the side frames.

In the above-described embodiment, the bolt 55 and the nut 56 are used as an illustrative example of the fastening member, but the fastening member consistent with the present invention is not limited to this specific configuration. For example, a screw or the like may be employed, instead.

In the above-described embodiment, the first bead B1 and the second bead B2 each shaped by depressing the relevant portion from inside to outside (to form a hollow inside) are illustrated by way of example, but the present invention is not limited to this specific configuration. For example, a first frame may be made of plastic (resin material) with a first protrusion formed as a solid portion (i.e. , without inside hollow), and/or a second protrusion formed as a solid portion (i.e., without inside hollow).

In the above-described embodiment, a car seat S for use in an automobile is illustrated as an example of a vehicle seat, but the vehicle seat to which the present invention is applicable is not limited to the illustrated car seat. For example, a seat for a vessel (a ship or a boat), a seat for an aircraft, or a seat for any other vehicle may be advantageously configured in accordance with the present invention.

In the above-described embodiment, the connecting pipe 40 is illustrated as an example of a connecting member, but the connecting member consistent with the present invention is not limited to such a pipe-like member. For example, a connecting member having a U-shaped cross section may be applicable. In this modified configuration, the connecting portion may also be configured to extend from an underside of the connecting member around the connecting member to an outer side of the connecting member in the front-rear direction by bending into a substantially L-shaped cross section along the underside and the outer side of the connecting member.

What is claimed is:

1. A vehicle seat with a load sensor for measuring a weight of an occupant, comprising:
    left and right first frames extending in a front-rear direction, and disposed apart from each other in a lateral direction, each first frame including a bottom wall to which the load sensor is attached, and sidewalls extending upward from left and right sides of the bottom wall; and
    at least one connecting member extending between the left and right first frames, such that one or each of front and rear end portions of the left first frame is connected to a corresponding end portion of the right first frame by the connecting member,
    wherein the bottom wall of at least one of the left and right first frames includes a connecting portion that is an end portion of the bottom wall to which the connecting member is connected and which extends outward in the front-rear direction farther beyond outer edges of the sidewalls in the front-rear direction and bends around the connecting member to an outer side of the connecting member in the front-rear direction.

2. The vehicle seat according to claim 1, wherein the bottom wall in which the connecting portion is provided includes a sensor mount portion to which the load sensor is attached and a bent portion disposed between the sensor mount portion and the connecting portion.

3. The vehicle seat according to claim 2, further comprising a fastening member by which the load sensor is fastened to a member disposed under the load sensor,
    wherein the bent portion includes a first bent portion that extends from the sensor mount portion and bends upward, and a second bent portion that extends from an upper end of the first bent portion, bends outward in the front-rear direction and connects to the connecting portion, the fastening member being disposed adjacent to and at an outer side of the first bent portion in the front-rear direction.

4. The vehicle seat according to claim 2, wherein the bottom wall in which the connecting portion is provided includes a first protrusion that includes a portion, formed in the connecting portion, which extends from a bending outer portion of the connecting portion disposed at an outer side of the connecting member in the front-rear direction toward the bent portion of the bottom wall at which the sidewalls are provided.

5. The vehicle seat according to claim 4, wherein the first protrusion further includes an inwardly extended portion which is formed in a portion of the bottom wall at which the sidewalls are provided, whereby the first protrusion extends from the bending outer portion of the connecting portion disposed at the outer side of the connecting member, inward in the front-rear direction across an outer edge of the portion of the bottom wall at which the sidewalls are provided.

6. The vehicle seat according to claim 1, wherein the outer edges of the sidewalls in the front-rear direction are adjacent to the connecting member.

7. The vehicle seat according to claim 1, wherein the load sensor is attached to each of two end portions of the bottom wall in the front-rear direction, and the bottom wall has a recessed portion provided in a midsection between the two end portions of the bottom wall.

8. The vehicle seat according to claim 1, further comprising a second frame which includes left and right outer walls disposed at laterally outer sides of the left and right first frame,
    wherein the bottom wall of the first frame includes a narrower portion disposed at a laterally inner side of a corresponding outer wall of the second frame and a wider portion being wider than the narrower portion and configured to protrude toward a laterally outer side farther beyond the outer wall of the second frame; and wherein the wider portion has a hole provided in such a position that a fastening member by which the load sensor is fastened to a member disposed under the load sensor is disposed inside the hole.

9. The vehicle seat according to claim 8, wherein the sidewalls include a first outer sidewall extending upward from a laterally outer side of the narrower portion of the bottom wall and a second outer sidewall extending upward from a laterally outer side of the wider portion of the bottom wall;

wherein the second outer sidewall has an end portion adjoining to the first outer sidewall, the end portion being lower than the first outer sidewall; and wherein the bottom wall in which the connecting portion is provided includes a second protrusion which extends from the narrower portion to the wider portion across a border between the narrower and wider portions.

* * * * *